United States Patent [19]

Swersey et al.

[11] Patent Number: 4,487,276
[45] Date of Patent: Dec. 11, 1984

[54] SCALE OF FLAT CONSTRUCTION

[76] Inventors: Burt L. Swersey, 152 Edgemont Rd.; Peter I. Fried, 15 Hearthstone Cir., both of Scarsdale, N.Y. 10583

[21] Appl. No.: 374,177

[22] Filed: May 3, 1983

[51] Int. Cl.³ .............. G01G 21/00; G01G 19/08; G01G 3/14; G01G 21/22
[52] U.S. Cl. .............. 177/1; 177/126; 177/140; 177/210 EM; 177/262; 177/DIG. 9
[58] Field of Search .............. 177/126, 127, 131, 140, 177/144, 145, 148, 149, 210 EM, 245, 253, 255, 256, 257, DIG. 9, DIG. 1

[56] References Cited

U.S. PATENT DOCUMENTS

| | | | |
|---|---|---|---|
| 3,032,131 | 5/1962 | Schmerl | 177/129 |
| 3,217,818 | 11/1965 | Engelsher et al. | 177/144 |
| 3,360,062 | 12/1967 | Potter | 177/144 |
| 3,658,143 | 4/1972 | Schwartz | 177/255 X |
| 3,795,284 | 3/1974 | Mracek | 177/144 |
| 4,023,633 | 5/1977 | Swersey | 177/144 |
| 4,050,532 | 9/1977 | Provi | 177/DIG. 9 |

Primary Examiner—George H. Miller, Jr.
Attorney, Agent, or Firm—Kenyon & Kenyon

[57] ABSTRACT

The scale is of limited height and utilizes Z-shaped flexures between the load frame and support frame. The scale can be placed in a hospital bed for weighing bed-ridden patients or for monitoring weight variations in bed-ridden patients.

A cart is provided for transporting the scale from place to place and includes an inclined ramp from which the scale may be readily moved onto a bed.

33 Claims, 20 Drawing Figures

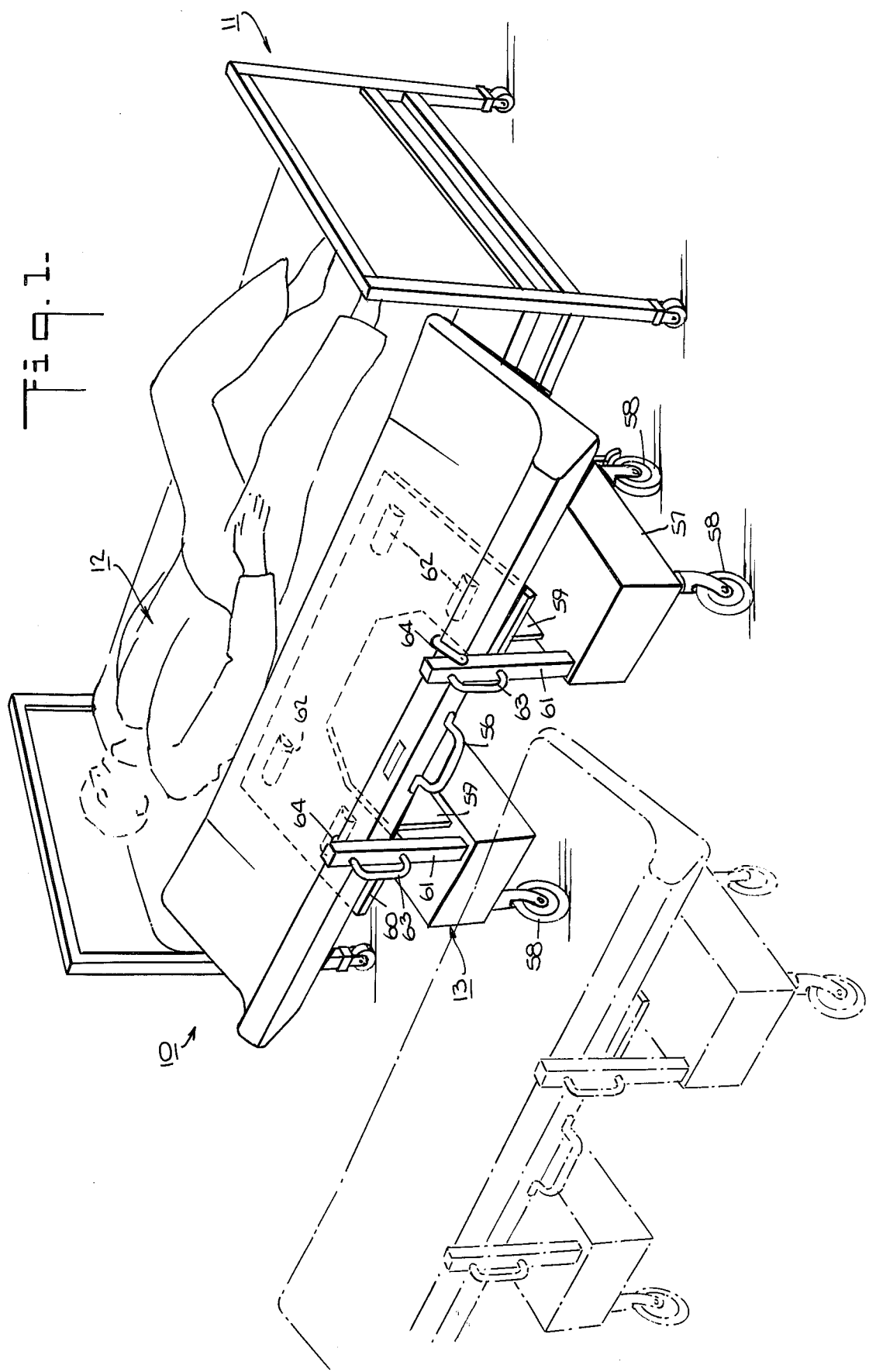

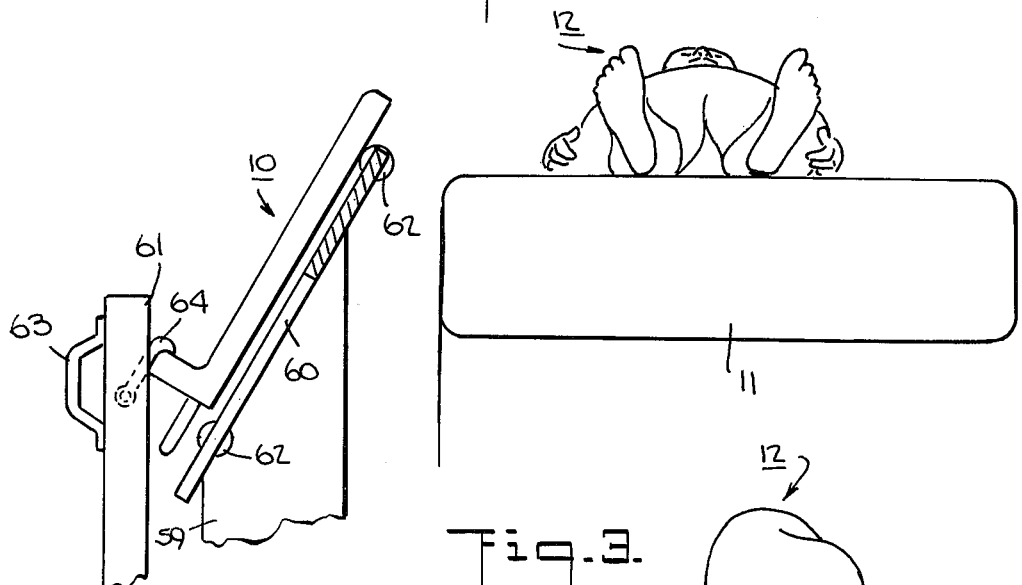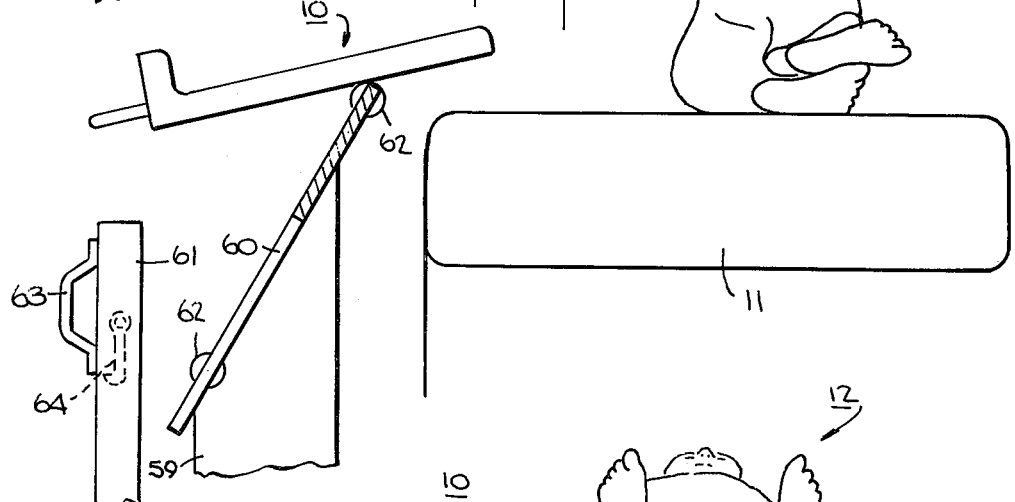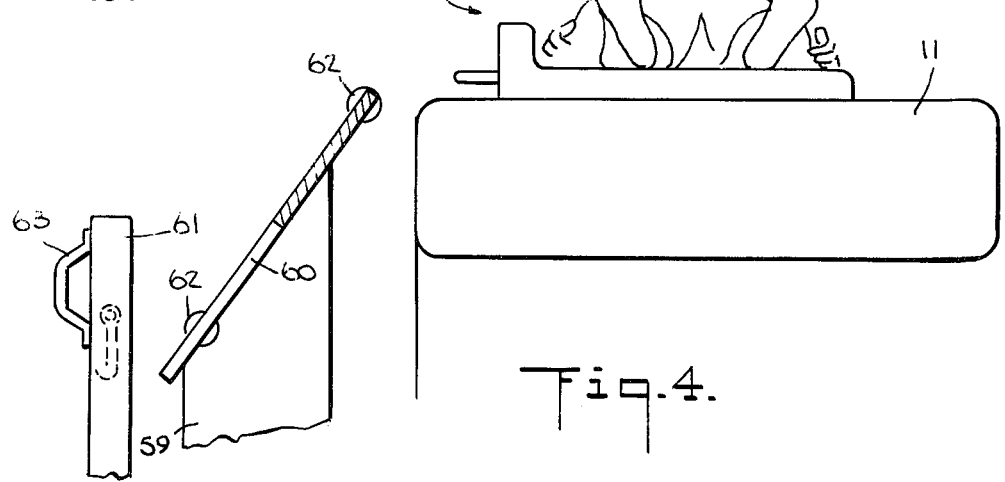

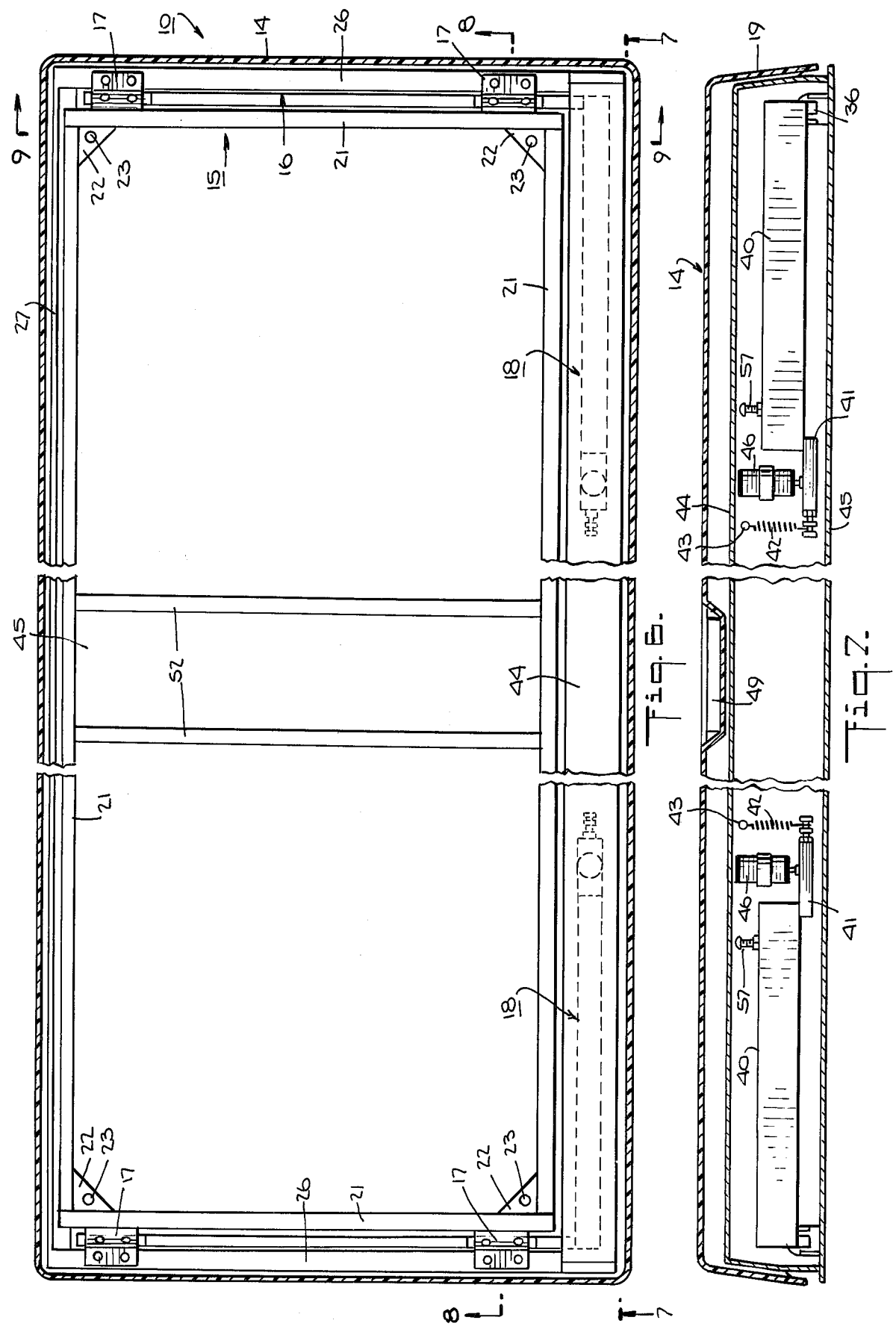

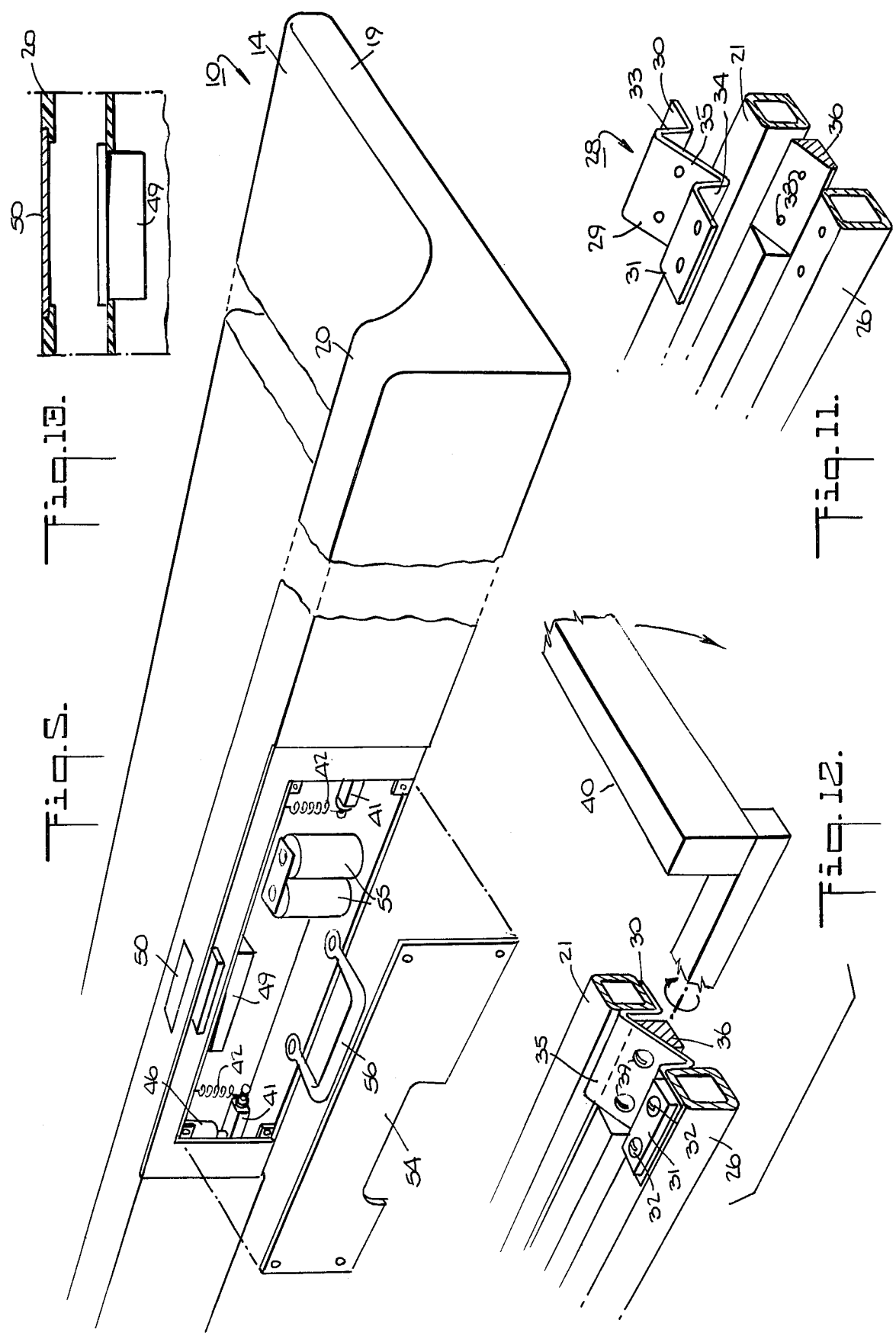

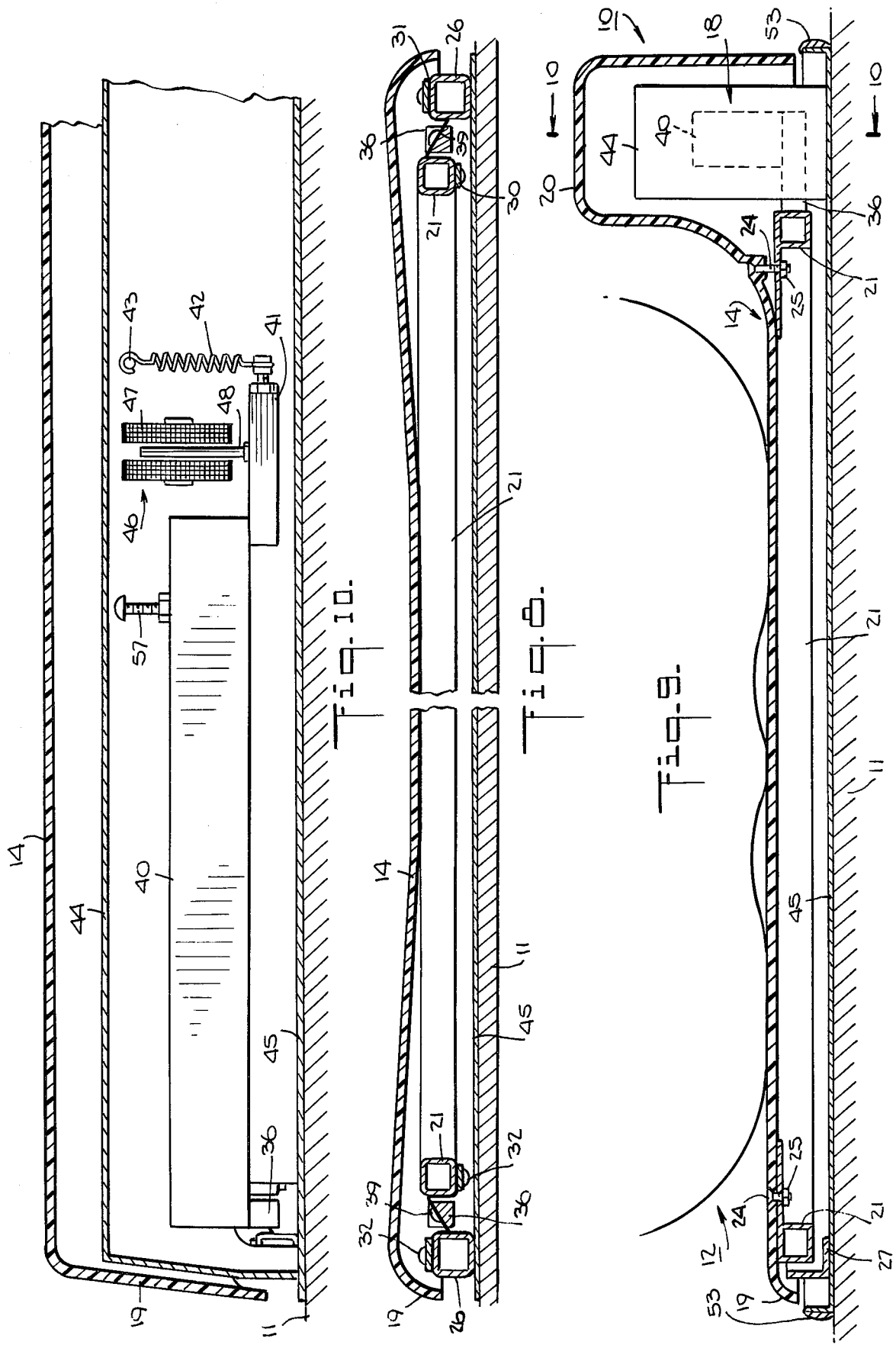

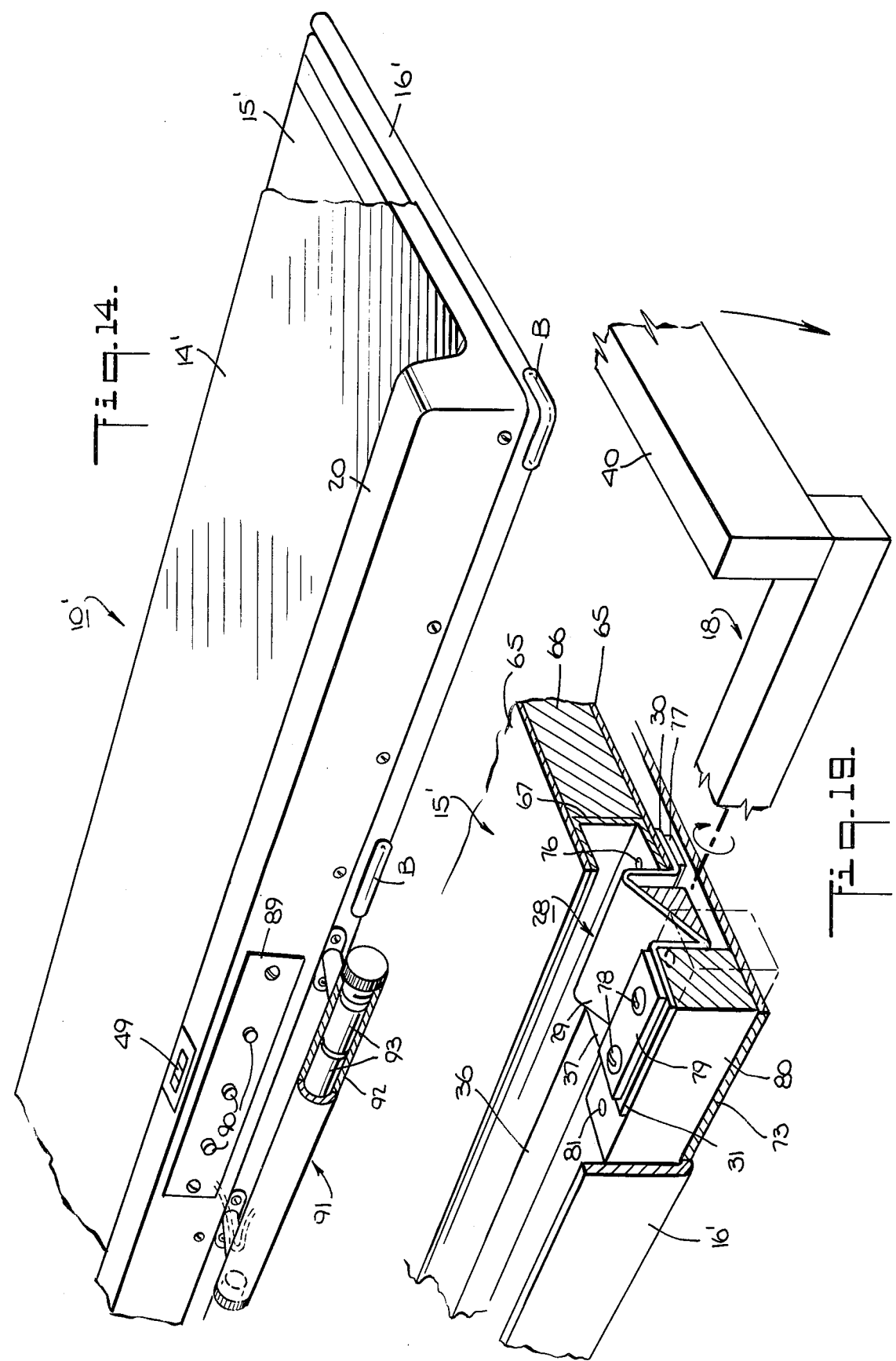

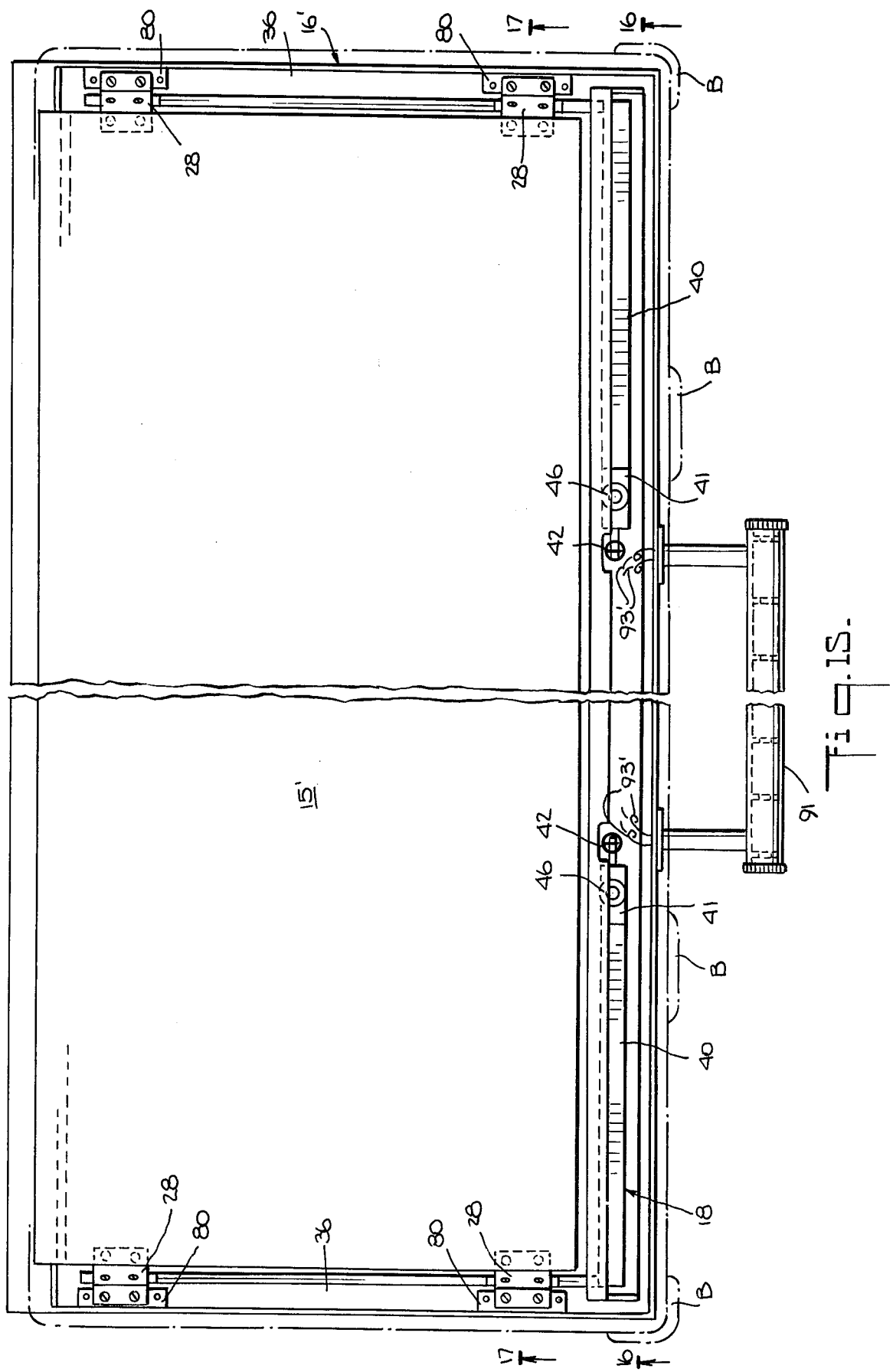

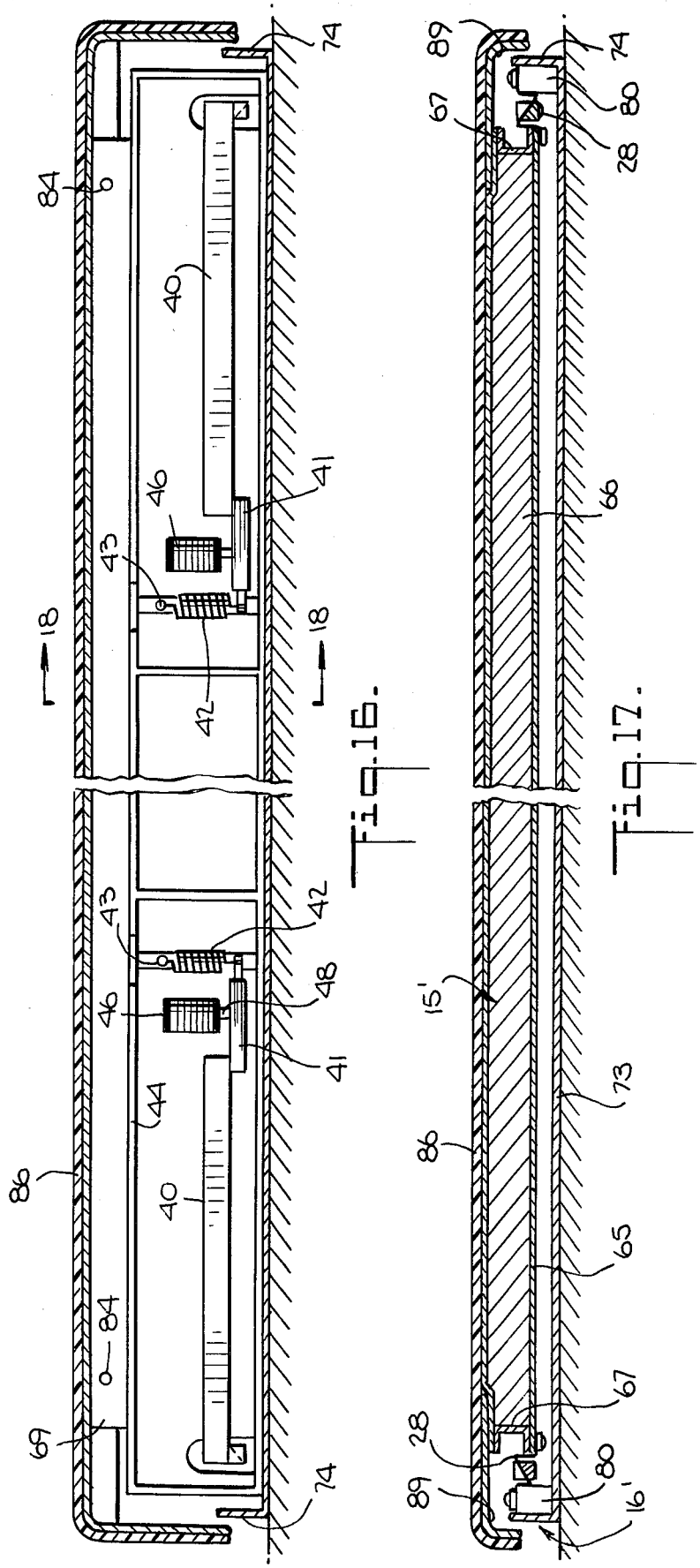

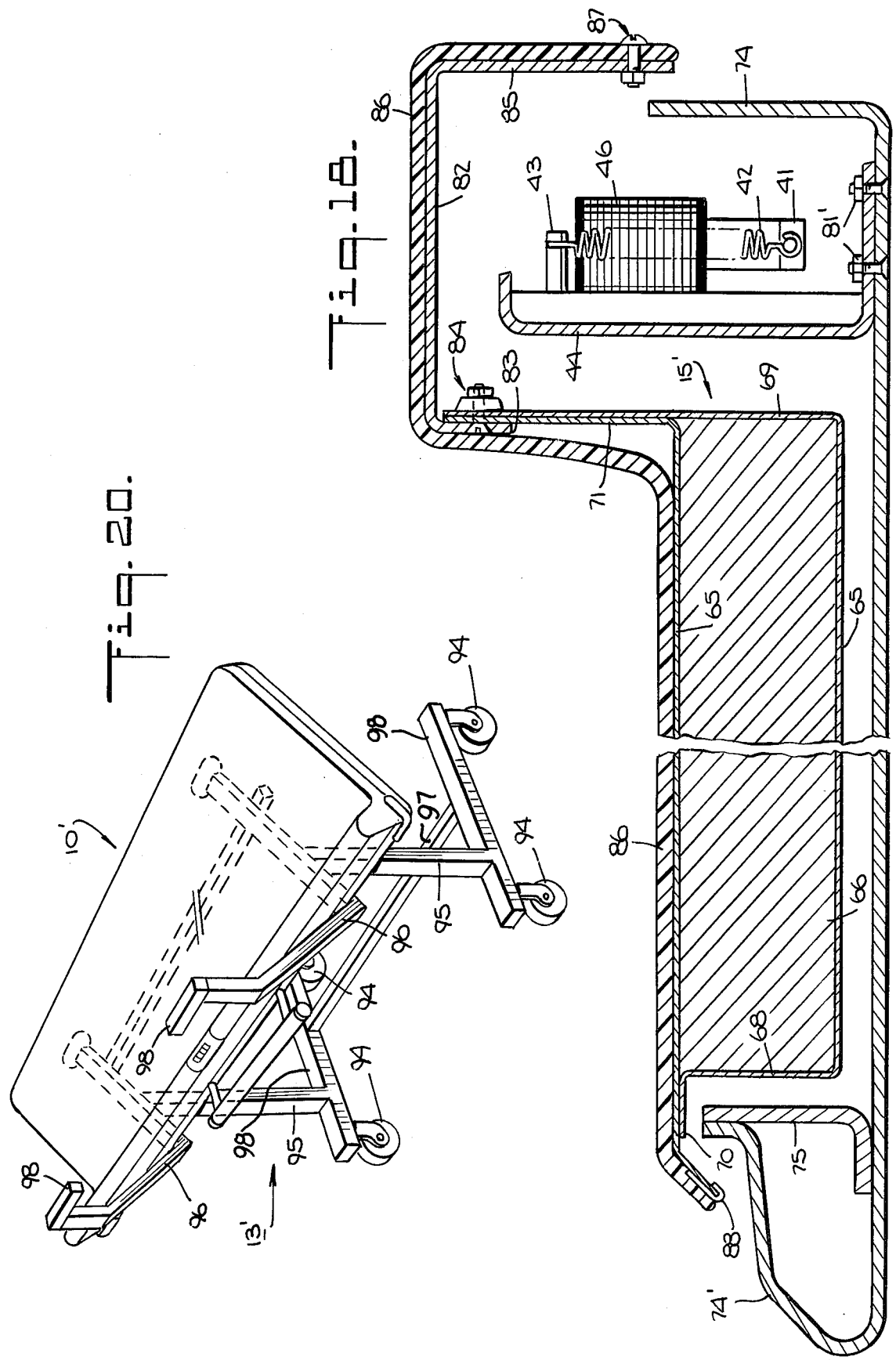

SCALE OF FLAT CONSTRUCTION

This invention relates to a scale of flat construction. More particularly, this invention relates to a scale for weighing bed-ridden patients.

As is known, various types of scales have been devised for weighing bed-ridden patients. In some cases, scales have been incorporated into the construction of a hospital bed in order to obtain a weight of a patient or a variation in weight of a patient over a period of time. In other cases, scales have been constructed to receive a hospital bed in order to obtain the weight or a weight variation of a patient in the bed. However, in either case, precise patient weights are frequently not obtainable since the tare weight of the bed and bed clothes e.g. sheets, pillow cases and the like are not readily available. Further, if the tare weight of the bed and bed clothes are required, the patient must first be removed from the bed so that the bed and bed clothes can be weighed and thereafter be returned to the bed. However, this is disturbing to the patient.

In order to avoid the need for obtaining a tare weight of the bed, it has also been known to construct scales which are able to weigh a patient directly. For example, it has been known to provide a scale which can be moved to the bedside and which has a lifting platform on which a patient can be placed for lifting above the plane of the bed. Such a scale is described in U.S. Pat. No. 3,032,131. However, scales of this type are cumbersome to use and are relatively expensive. Further, lifting of the patient from the bed may create a sensation which is disturbing to the patient.

Still other scales are known for lifting patients from a bed which utilize slings or stretchers and overhead linkage systems for lifting the sling or stretcher. However, these scales which are of hammock-type are not only cumbersome to use but also require manipulation of the patient in order to place the sling or stretcher under the patient. Further, since the slings are suspended in hammock fashion, not only is the patient subjected to a sensation of being lifted but also to a sensation of being swung to and fro.

Accordingly, it is an object of this invention to provide a scale which can be conveniently placed on a hospital bed for obtaining accurate weights and weight variations of a bed-ridden patient.

It is another object of the invention to provide a scale of limited height.

It is another object of the invention to provide a scale of limited height which can be easily transported from place to place.

It is another object of the invention to provide a scale for weighing patients in bed which is of relatively simple stable construction.

It is another object of the invention to provide a scale which can be placed on a bed for weighing patients which is very sensitive to weight variations.

Briefly, the invention provides a self-contained portable scale which includes a platform for receiving a load, a load frame which is secured to the platform, a support frame, flexure means securing the load frame to the support frame in order to permit movement of the load frame relative to the support frame in response to a load placed on the platform and means secured to the flexure means for producing a read-out of the weight of the load placed on the platform.

The scale is of limited height, for example being in the range of from one inch to two inches depending upon the size of scale. For example, for reduced lengths for example for weighing infant patients, the scale may have a height of approximately one inch.

The platform is constructed in flattened form to receive a load such as a bed-ridden patient. For example, for an adult patient, the platform is of elongated rectangular shape and has a raised wall along one side against which the patient may rest. In addition, the platform is provided with a peripheral skirt so as to define a substantially enclosed space within which the load frame and support frame are disposed in a hidden or recessed manner. The platform may be made of any suitable material such as a plastic or a reinforced plastic material.

The flexure means includes at least one Z-shaped flexure made for example of spring steel and having a body of Z-shaped cross-section with a pair of parallel legs, one of which is of greater cross-sectional length than the other leg. Each flexure also has a pair of flanges one of which is secured to the load frame and the other of which is secured to the support frame. The shape of the flexure permits the load frame and support frame to be disposed one within the other. When the load frame moves relative to the support frame, the Z-shaped flexure permits movement while pivoting about a mid-axis thereof.

The means for producing a read-out includes a torsion bar or tube secured to the Z-shaped flexure for movement therewith during movement of the load frame relative to the support frame. In addition, a beam is secured at one end to the torsion bar, a spring is secured to and between the support frame and the beam for restraining motion of the beam and a read-out means is provided for indicating the amount of movement of the beam as a measure of the load on the platform. This read-out means may include a digital display for displaying a digital value of the load on the platform while the raised wall on the platform has a window therein above the digital display for viewing the display.

Because of the limited height of the scale, the scale may be readily placed on a hospital bed for weighing a bed-ridden patient. To this end, a patient may first be turned over on one side while the scale is placed alongside the patient. Next, the patient can be rolled onto the scale platform with the weight of the patient then being directly read-out.

It is to be noted that the read-out means may be set to a zero reading immediately before a patient is rolled onto the scale so as to compensate for any variations due to the placement of the scale on the bed. However, it has been found that tilting of the scale on a hospital bed makes very little difference in the sensitivity of the scale. Significantly, the accuracy of the scale remains very high, for example, to ten grams.

In those instances where the weight of a bed-ridden patient is to be monitored over a period of time, the scale may be left in place and weight readings may be taken from time to time in known manner. In this regard, the platform can be contoured in a suitable manner and may be of a suitable length so that the patient remains in a comfortable position while resting on the platform.

Since the platform remains on the bed during a weighing operation, the patient is not lifted from the bed. Hence, sensations affecting the equilibrium of the patient need not be introduced.

It is believed that the Z-shaped flexures when used in pairs at two opposite ends of the load frame allow little lateral play between the load frame and support frame and contribute to the sensitivity of the scale. Also, the flexures allow for bending of the frame elements as well as for expansion between the load frame and support frame without transferring these changes into weight readings. Further, the flexures provide for a self-centering of the load frame should the frame twist.

In cases where the scale is not readily manually transportable, a movable cart is provided to transport the scale from place to place. This cart includes a frame provided with wheels or casters, a ramp which is mounted on the frame at an inclined angle to receive the scale and a stop which is spaced from a lower end of the ramp and against which the scale abuts. The cart is sized so that the scale can be readily removed from or placed on the ramp while the cart is alongside a bed.

The ramp is of a height at the upper end to permit movement of the scale thereover onto a bed for weighing of a patient in the bed. In addition, the ramp is provided with a plurality of slides or rollers to facilitate sliding of the scale.

The frame may also be recessed in an intermediate portion along one side in order to permit access when moving the scale from the ramp.

When the scale is to be used, the cart is rolled into a position e.g. alongside a hospital bed. Thereafter, the lower side of the scale resting against the stop on the cart is lifted and the scale pushed over the upper edge of the ramp onto the bed. While the scale is being slid onto the bed, one may move into the recessed portion of the frame without a need to lean over in order to place the scale in proper position on the bed. In similar manner, the scale may be slid off the bed onto the ramp and pivoted downwardly against the stop. The cart may then be moved to another bed for weighing another patient.

These and other objects and advantages of the invention will become more apparent from the following detailed description taken in conjunction with the accompanying drawings in which:

FIG. 1 illustrates a perspective view of a cart and scale constructed in accordance with the invention along side a hospital bed;

FIG. 2 illustrates an end view of the cart and scale when placed along side a hospital bed;

FIG. 3 illustrates an intermediate position of the scale during placement on a hospital bed;

FIG. 4 illustrates an end view of the scale in place on a bed with a patient thereon;

FIG. 5 illustrates an exploded view of a portion of the read-out means of the scale;

FIG. 6 illustrates a plan view of the load frame and support frame of the scale in accordance with the invention;

FIG. 7 illustrates a view taken on line 7—7 of FIG. 6;

FIG. 8 illustrates a view taken on line 8—8 of FIG. 6;

FIG. 9 illustrates a view taken on line 9—9 of FIG. 6;

FIG. 10 illustrates a view taken on line 10—10 of FIG. 9;

FIG. 11 illustrates an exploded view of a flexure for mounting the load frame and support frame of the scale;

FIG. 12 illustrates a perspective view of a part of a flexure means according to the invention;

FIG. 13 illustrates a part cross-sectional view of a display means below a window on the raised wall of the platform of the scale in accordance with the invention;

FIG. 14 illustrates a part perspective view of a modified scale in accordance with the invention;

FIG. 15 illustrates a plan view of the scale of FIG. 14;

FIG. 16 illustrates a view taken on line 16—16 of FIG. 15;

FIG. 17 illustrates a view taken on line 17—17 of FIG. 15;

FIG. 18 illustrates a view taken on line 18—18 of FIG. 16;

FIG. 19 illustrates an enlarged detailed view of the mounting of flexure in a scale of FIG. 14; and FIG. 20 illustrates a modified cart for supporting a scale in accordance with the invention.

Referring to FIG. 1, the scale 10 is constructed in a generally flat elongated manner for placement on a surface, such as a hospital bed 11 for weighing a load, such as a bed-ridden patient 12. As indicated, depending upon the size of the scale 10, the scale can be transported from place to place on a movable cart 13.

While the scale 10 is shown as being of a length approximately equal to the length of a patient 12 to be weighed, the scale 10 may be made in various sizes. For example, for weighing adult patients the scale 10 may be of approximately six feet in length, approximately one and one-half feet in width and from one to two ¼ inches in height; for weighing children, the scale may be of approximately four feet in length; and for weighing infants, the scale may be approximately two feet long with a smaller width.

Referring to FIGS. 6 and 8, the scale 10 includes a platform 14 for receiving the load, a load frame 15, a support frame 16, and flexure means 17 securing the load frame to the support frame and means 18 secured to the flexure means 17 for producing a read-out of the weight of the load.

The platform 14 is made of one piece of any suitable material, for example of a plastic or a glass fiber reinforced plastic material, and has a depending peripheral skirt 19 (see FIGS. 7 and 8) defining a substantially enclosed space. The platform 14 is also contoured as indicated in FIG. 8 in order to receive a bed-ridden patient in a comfortable manner.

Referring to FIG. 9, the platform 14 also has a raised longitudinal wall 20 along one end which provides an abutment against which a bed-ridden patient may be placed and which forms a housing of rectangular cross-sectional shape for housing the read-out means 18.

As shown in FIG. 6, the load frame 15 is constructed in a rectangular frame-like manner, for example of four box-beam or tubular rails 21 which are secured together, for example by welding, within the space defined by the platform skirt 19. In addition, gusset plates 22 are secured as by welding to the rails 21 at the four corners of the frame 15 and each is provided with an aperture 23 sized to receive a shank of a bolt 24 (see FIG. 9) which passes therethrough from the platform 14. Suitable nuts 25 are threaded onto the bolts 24 below the plates 22 to secure the platform 14 to the load frame 15. It is to be noted that the bolts 24 may have heads which are recessed within the platform 14 or the bolts 24 may be molded into the platform 14 so that the outside surface of the platform presents a smooth continuous surface.

Referring to FIG. 6, the support frame 16 is also disposed within the spaced defined by the platform skirt 19 and is constructed of a pair of parallel box-shaped or tubular rails 26 (FIG. 8) and a pair of parallel angle members 27 (FIG. 9). These rails 26 and angle members 27 are made of metal or any other suitable structural material and are secured together as by welding. As indicated in FIG. 6, the angle members 27 extend parallel to the longitudinal axis of the scale 10.

The flexure means 17 securing the load frame 15 to the support frame 16 permits movement of the load frame 15 relative to the support frame 16 in response to a load placed on the platform 14. The flexure means includes two pairs of flexures 28, one pair at each end of the scale. Each pair of flexures 28 is secured between a rail 21 of the load frame 15 and an adjacent rail 26 of the support frame 16.

Referring to FIG. 11, each flexure 28 has a Z-shaped body 29 with a pair of flanges 30, 31 extending from opposite sides of the body 29. As shown in FIG. 12, one flange 30 is secured to the load frame rail 21 and the other flange 31 is secured to the support frame rail 26. These flanges 30, 31 are substantially parallel to each other so that other flange 30 is secured to the bottom of the load frame rail 21 while the other is secured to the top of the support frame rail 26, e.g. by a pair of screws or bolts 32. The body 29 of each flexure 28 has a pair of parallel legs 33, 34 connected by a web 35. As shown in FIG. 11, one leg 33 is of greater cross-sectional length than the other, i.e. the leg 33 adjacent the load frame 15. Also, each flexure 28 is made of a suitable material, such as spring steel.

The flexures 28 are disposed in relation to the support frame rails 26 so that when a load is placed on a platform 14, the load frame 15 may descend in a vertical plane, as viewed in FIG. 8, while the web 35 of each flexure 28 adjacent to support frame rail 26 distorts in a manner to maintain the load frame 15 parallel to the support frame.

Referring to FIGS. 6 and 7, the means 18 secured to the flexure means 17 for producing a read-out of the weight of a load placed on the platform 14 includes a torsion bar 36 secured to each respective pair of flexures 28 at one end of the scale. As the two ends of the scale contain duplicate means, only one will be described hereinafter.

As indicated in FIG. 11, each torsion bar 36 has a recess 37 to receive the webs 35 of a flexure 28 and a pair of threaded bores 38 to receive bolts 39 (FIG. 12) for securing the web 35 to the torsion bar 36 in order to impart a turning motion to the torsion bar 36 as the load frame 15 moves with respect to the support frame 16.

Referring to FIG. 10, each torsion bar 36 is secured at one end to a beam 40 which extends longitudinally of the scale 10 within the housing defined by the raised wall 20 of the platform 14 (see FIG. 9). Each beam 40 carries an extension 41 at the free end which, in turn, is secured to one end of a spring 42 secured to a pin 43 fixed in the scale 10. As indicated, the fixed pin 43 is mounted in a housing frame 44 disposed within the raised wall 20 of the platform and which extends over the beams 40.

As shown in FIG. 7, the housing frame 44 is secured to a support plate 45 which, in turn, is secured to the underside of the support frame 16. In this manner, the housing frame 44 is fixedly secured with respect to the support frame 16 and each spring 42 is secured to and between the support frame 16 and a respective beam 40 for restraining motion of the beam 40.

Each means secured to the flexure means 17 also includes a read-out means for indicating the amount of movement of the beams 40 as a measure of the load on the platform 14. This readout means includes a linear variable differential transformer (hereinafter LVDT) 46 mounted on a beam extension 41. Each LVDT 46 includes a coil 47 which is secured on the housing frame 44 in suitable manner and a core 48 which is mounted on a beam extension 41 (see FIG. 10). The core 48 is positioned relative to the coil 47 so as to travel therein in known manner. In addition, each LVDT 46 is electrically connected via suitable electrical lines (not shown) to a digital display 49 for displaying a digital value of the load on the platform 14. To this end, the raised wall 20 of the platform 14 has a window 50 spaced above the digital display 49 so that the digital display can be easily read. In use, each LVDT 46 emits a signal to the digital display 49 corresponding to the movement of the core 48 within the coil 47 and thus to the displacement of the beam 40 relative to the support frame 16. The digital display 49 is constructed so as to receive the signals from the two LVDT's and to display a digital value corresponding to the received signals as a measure of the weight of a load on the platform 14.

As shown in FIGS. 10, each beam 40 carries a stop 51, formed by a threaded bolt and a lock nut. The stop 51 serves to limit upward motion of a beam 40 and also permits an adjustment to be made in the disposition of a beam and the spring 42 attached thereto.

The support plate 45 which is secured to the bottom of the support frame 15 is of generally rectangular shape and may be stiffened by suitable cross members 52 (FIG. 6) or by suitable transverse corrugations.

In addition, as indicated in FIG. 9, the periphery of the scale 10 can be provided with a bumper 53, for example of rubber, which is secured to the angle members 27 and to the rails 26 of the support frame 16.

Referring to FIG. 5, the back of the raised wall 20 of the platform 14 is provided with a removable panel 54 so as to permit access to the read-out means. As indicated, batteries 55 are provided within the area covered by the panel 54 and are connected to the transformers 46 in order to supply power thereto. Further, as shown in FIG. 5, the platform 14 may be provided with a handle 56 for lifting and transporting purposes.

Referring to FIG. 1, the cart 13 may be of any suitable size in order to transport the scale 10 from place to place. For example, the cart 16 as illustrated has a frame including a base 57 mounted on four wheels 58 and a pair of upstanding walls 59, a ramp 60 mounted on the walls 59 of the frame at an inclined angle and a stop in the form of a pair of vertical posts 61 mounted on the base 57 and spaced from a lower end of the ramp 60. As shown in FIG. 2, the ramp is fixedly mounted on the walls 59 of the frame at a fixed angle, for example of 35° from the vertical. In addition, the ramp 60 has a plurality of rollers 62 mounted therein for rolling of the scale 10 thereon.

The ramp 60 is recessed intermediately thereof as indicated in FIG. 1 along one side within the bounds of the posts 61 in order to permit access for moving the scale 10 from the ramp 60. The ramp 60 is of a height at an upper end to permit movement of the scale 10 thereover on to the bed 11 for weighing of the patient 12 in the bed 11 (see FIG. 2). The posts 61 may also be provided with handles 63 in order to facilitate movement of the cart 13 from place to place. As shown in FIG. 1, the cart 13 can be provided with a lock 64 of any suitable type, such as a pivotal latch, for locking the scale 10 in place for transportation.

In use, the cart 13 with the scale 10 thereon is wheeled to one side of the bed 11 in which the patient 12 is disposed (see FIGS. 1 and 2). Next, the user lifts the lower end of the scale 10 and slides the scale 10 over the top end of the ramp 60 via the rollers 62 positioned thereat (FIG. 3) The scale 10 is thus slid onto the bed 11 with the patient 12 rolled to one side. The scale 10 is then positioned under the patient 12 and the patient 12 is rolled back onto the scale 10. At this time, a reading may be made of the weight of the patient 12 directly from the display 49 located under the window 50 on the scale 10.

When the patient 12 is placed on the platform 14, the platform 14 and the load frame 15 move downwardly relative to the support frame 16. At this time, each torsion bar 36 pivots so as to cause each beam 40 to pivot about the axis of the torsion bar 36 and against the bias of the respective compression spring 42. Each LVDT 46 senses this and emits a corresponding signal to the display 49. The display 49, in turn, shows a digital read-out of the patient's weight.

Referring to FIG. 14, the scale 10' may be constructed with various modifications. For example, as indicated in FIGS. 17 and 18, the load frame 15' is constructed of a pair of spaced flat sheets 65 and a lightweight filler material 66 between the sheets 65 to define a structurally rigid construction. The sheets 65 may, for example, be made of aluminum skins of a thickness of 0.040 inches. The filler material 36 may be made of a honeycomb construction or of balsa wood. The overall thickness of the load frame 15' is approximately 1⅜ inches. As indicated in FIG. 17, the load frame 15' has a channel 67 of metal at each of two opposite ends. Each channel 67 extends across the width of the load frame 15'.

Referring to FIG. 18, the aluminum sheets 65 of the load frame 15' are shaped along the sides so as to fit together. For example, the lowermost sheet 65 has a pair of upstanding side walls 68, 69 with the shorter side wall 68 having an outwardly directed flange 70. The upper sheet 65 seats on the flange 70 and has an upstanding flange 71 which abuts against the upstanding flange 69 of the lower sheet 65. As shown, the edge of the upper sheet 65 projects outwardly beyond the flange 70 of the lower sheet 65 and is formed with a downwardly directed lip 72.

Referring to FIGS. 15 and 17, the support frame 16' has a base formed, for example with a flat bottom 73 and four upstanding walls 74. Three of the walls 74 are of flat shape while a fourth wall 74' is rounded (as shown in FIG. 18) in order to define a nose or forward edge of the scale 10'. In addition, an L-shaped number 75 is secured in place adjacent to the shaped wall 74 to support the shaped wall 74'.

Referring to FIG. 15, the load frame 15' is mounted on the support frame 16' via four flexures 28 of a construction similar to that described above. Referring to FIG. 19, each flexure 28 has a Z-shaped body 29 with a pair of flanges 30, 31 extending from opposite sides of the body. One flange 30 is secured to the channel 67 via a pair of screws 76 (only one of which is shown) and a clamp plate 77. The other flange 31 is secured via screws 78 and a clamp plate 79 to a block 80 of limited length which is fixed to the bottom 73 of the base via bolts 81.

Referring to FIG. 15, a means 18 is secured to each pair of flexures 28 as above, for producing a read-out of the weight on the scale. This means 18 includes a torsion bar 36 which is secured to each pair of flexures 28 via suitable recesses 37. Each torsion bar 36 is secured at one end (see FIG. 19) to a beam 40 which extends longitudinally of the scale 10'. As shown in FIG. 16, each beam 40 carries an extension 41 which, in turn, is fixed to an end of a spring 42 secured to a fixed pin 43. As indicated, the pin 43 is mounted in a housing frame 44 which extends along the beams 40. As indicated in FIG. 18, the frame 44 is secured by nut and bolt assemblies 81' to the base 73.

A read-out means for indicating the amount of movement of the beams 40 as a measure of the load includes a LVDT 46 which is mounted on a beam extension 41. Each LVDT 46 includes a coil 47 which is secured to the frame 44 and a core 48 which is mounted on a beam extension 41 (see FIG. 16). Each LVDT is electrically connected via suitable electrical lines (not shown) to a digital display 49 (see FIG. 14) for displaying a digital value of the load. Of note, flexible wires may be used to connect each LVDT to the digital display 49.

Referring to FIG. 18, the load frame 15' carries a channel-shaped member 82 which serves to cover over the housing 44. The member includes a short depending leg 83 which is bolted to the extending walls 69, 71 of the load frame sheets 65 via a plurality of nut and bolt arrangements 84. A longer leg 85 of the member 82 extends downwardly beyond the plane of the upstanding rear wall 74 of the support frame 16'.

As indicated in FIGS. 14 and 18, a plastic cover 86 is secured to the load frame 15' to define a load-receiving platform. This plastic cover 86 may be made of a ⅛ inch thick KYDEX plastic. The plastic cover 86 is continuous over the member 82 and is secured at a lower end to the leg 85 via screws or nut and bolt assemblies 87. Along the front edge of the scale 10', the cover 86 is attached via an aluminum hook-like piece 88 to the depending lip 72 of the top sheet 65 of the load frame 15'.

Referring to FIG. 17, the load frame 15' has an indented upper edge where the channels 67 are located. The indented edges accommodate aluminum cover plates 89 which project over and protect the flexures 28 and support the plastic cover 86. Each of the cover plates 89 may be secured in place by bolts which pass through the respective channel member 67 and edges of the upper sheet 65.

Referring to FIG. 14, the channel-shaped member 82 and plastic cover 86 form a raised wall 20 as above. In addition, the back of the raised wall 20 has an opening which provides access to the read-out means and is covered over by a plate 89. This plate 89 carries a suitable switch 90 for activating the read-out means of the scale.

Referring to FIG. 14, a handle 91 is secured to the rear wall 74 of the base astride the plate 89 for manipulation of the scale 10'. In addition, the handle 91 includes a hollow section 92 which is capable of receiving a plurality of batteries 93. Suitable electrical connections 93' (see FIG. 15) are also provided to connect the batteries 93 with the respective LVDTs 46 to energize the same.

Referring to FIG. 20, the cart 13' may also be constructed with a frame of skeletal structure. As indicated, the cart 13' is provided with wheels 94 for rolling from place to place. In addition, the cart 13' includes a pair of upright supports 95, for example steel, a pair of V-like brackets 96 which are fixed to the vertical supports 95 and a connecting bar 97 which extends across and is secured to the horizontal members 98. Each of the brackets 96 has a leg which forms a stop for the scale and carries a horizontal bar at an upper end which forms a handhold for moving of the cart 13'. In addition, each bracket 96 has a cylindrically-shaped slider 99 secured at one end, for example, of a plastic material suitable for sliding of the scale 10' thereover in a relatively friction-free manner.

The cart 13' and the scale 10' can be manipulated in the same manner as described above. In this regard, note is made that the brackets 96 and the bar 97 define a recess along one side of the cart so as to permit access thereto for moving the scale 10' from the ramp defined by the brackets 96.

It is noted that the scale may be constructed so as to be placed on other surfaces than beds. For example, the scale may be constructed to be recessed within a floor so that a load to be weighed can be easily moved onto the scale. In such cases, the scale can be used in a multiple-form. For example, for weighing a four wheeled vehicle, four scales may be used with each weighing one wheel of the vehicle or six scales may be used for weighing six wheels of a tractor-type vehicle. Further, the scales can be interconnected electronically so that the readings of the scales can be summarized with one read-out of the weight of the vehicle.

The scale may also be used with other supports than a bed, for example an operating table or other type of table which receives a patient.

The invention thus provides a scale of flat construction and contour which can be readily utilized in weighing bed-ridden patients such as adults, small children and infants.

The invention also provides a scale which is relatively accurate. In this respect, it has been found that any slight tilting of the scale on a hospital bed, for example a 5° tilt, does not effect the accuracy of the scale. Further, it has been found that the Z-shaped flexures 28 allow a small lateral play to occur between the load frame 15 and support frame 16. This allows for bending of the scale elements as well as for expansion of the scale elements. These changes further are not transferred into weight readings as the flexures 28 keep the load frame 15, 15' self-centered even if the frame 15 twists.

It is to be noted that various modifications can be made in the scale. For example, use can be made of only one linear variable differential transformer for the two beams. Also, the digital read-out may be placed on the raised wall of the platform.

The invention thus provides a scale of limited height which can be readily placed on a bed for weighing a bed-ridden patient. The scale is suitably sized to receive a patient in a comfortable manner and can be readily manipulated by hospital personnel onto and off a hospital bed in a relatively easy and rapid manner.

The invention further provides a scale which can be placed on a bed to obtain accurate readings of weight and variations in weight of a bed-ridden patient.

Due to the limited height of the scale, the scale may be utilized in various environments where low heights are of interest.

The scale functions in a manner similar to that as described in U.S. Pat. No. 4,023,633 in order to translate a movement of the load frame into a read-out of weight.

This application is a continuation-in-part of pending application Ser. No. 259,942, filed May 4, 1981.

The scale may also be provided with suitable spaced apart bumpers B, for example, on the support frame 16'.

What is claimed is:

1. A portable scale comprising
   a platform for receiving a load thereon, said platform having a depending peripheral skirt to define a substantially enclosed space;
   a load frame secured to said platform within said space;
   a support frame within said space for mounting the scale on a surface;
   flexure means securing said load frame to said support frame to permit movement of said load frame relative to said support frame in response to a load placed on said platform, said flexure means including at least one Z-shaped flexure having a pair of flanges, one of said flanges being secured to said load frame and other of said flanges being secured to said support frame; and
   means secured to said flexure means for producing a read-out of the weight of the load placed on said platform.

2. A scale as set forth in claim 1 wherein said platform is made of plastic.

3. A scale as set forth in claim 1 wherein said skirt has a height of approximately one inch.

4. A scale as set forth in claim 1 wherein said skirt has a height of approximately two inches.

5. A scale as set forth in claim 1 wherein said platform is of elongated rectangular shape.

6. A scale as set forth in claim 5 wherein said platform has a raised wall along one side to provide an abutment for a bed-ridden patient thereon.

7. A scale as set forth in claim 1 wherein said means secured to said flexure means includes a torsion bar secured to said Z-shaped flexure for movement therewith during movement of said load frame relative to said support frame, a beam secured at one end to said torsion bar, a spring secured to and between said support frame and said beam for restraining motion of said beam and read-out means for indicating the amount of movement of said beam as a measure of the load on said platform.

8. A scale as set forth in claim 7 wherein said read-out means includes a digital display for displaying a digital value of the load on said platform.

9. A scale as set forth in claim 8 wherein said platform has a raised wall along one side with a window therein spaced above said digital display.

10. A portable scale comprising
    a platform for receiving a load thereon, said platform having a depending peripheral skirt to define a substantially enclosed space;
    a load frame secured to said platform within said space, said load frame including a pair of spaced flat sheets and a light-weight filler material between said sheets to define a structurally rigid construction;
    a support frame within said space for mounting the scale on a surface;
    flexure means securing said load frame to said support frame to permit movement of said load frame relative to said support frame in response to a load placed on said platform; and
    means secured to said flexure means for producing a read-out of the weight of the load placed on said platform.

11. A scale as set forth in claim 10 wherein said filler material is of honeycomb construction.

12. A scale as set forth in claim 10 wherein said sheets are made of aluminum.

13. A scale as set forth in claim 10 wherein said load frame further includes a channel at each of two opposite ends secured to a respective flexure means.

14. A scale as set forth in claim 13 wherein each flexure means includes a Z-shaped flexure having a pair of flanges, one of said flanges being secured to a respective channel of said load frame and the other of said flanges being secured to said support frame.

15. A scale of limited height comprising
a rectangular platform for receiving a load thereon and having a raised wall on one side to provide an abutment for a bed-ridden patient and a window in said wall;
a load frame secured to said platform;
a support frame;
flexure means securing said load frame to said support frame to permit movement of said load frame relative to said support frame in response to a load placed on said platform; and
means secured to said flexure means for producing a read-out of the weight of the load placed on said platform, said means including a digital display for displaying a digital value of the load for viewing through said window.

16. A scale as set forth in claim 15 which has a height in the range of from one inch to two inches.

17. A scale as set forth in claim 15 wherein said frames are each rectangular with said load frame disposed within said support frame and said flexure means includes a pair of Z-shaped flexures at two opposite sides of said frames for securing said frames together.

18. In a scale, the combination comprising
a load frame for receiving the weight of a load thereon;
a support frame; and
flexure means securing said load frame to said support frame to permit movement of said load frame relative to said support frame in response to a load imposing a weight on said load frame, said flexure means including at least one Z-shaped flexure having a pair of flanges, one of said flanges being secured to said load frame and the other of said flanges being secured to said support frame.

19. The combination as set forth in claim 18 which further comprises a torsion bar secured to said Z-shaped flexure for movement therewith during movement of said load frame relative to said support frame, a beam secured at one end to said torsion bar, a spring secured to and between said support frame and said beam for restraining motion of said beam and read-out means for indicating the amount of movement of said beam as a measure of the load.

20. The combination as set forth in claim 18 wherein said Z-shaped flexure is made of spring steel.

21. The combination as set forth in claim 18 wherein said frames are each rectangular with said load frame disposed within said support frame.

22. The combination as set forth in claim 18 wherein said frames are disposed in horizontal planes.

23. A portable scale comprising
a rectangular load frame having a pair of spaced sheets, a filler material between said sheets to define a rigid construction and a pair of channels between said sheets, each said channel being disposed at an opposite end of said frame from the other channel;
a plastic cover secured to said load frame to define a load-receiving platform;
a support frame for supporting said load frame;
flexure means securing said load frame to said support frame to permit movement of said load frame relative to said support frame in response to a load placed on said platform; and
means secured to said flexure means for producing a read-out of the weight of the load placed on said platform.

24. In combination,
a movable cart having a frame, a ramp mounted on said frame at an inclined angle and a stop spaced from a lower end of said ramp; and
a flat weighing scale of elongated shape slidably mounted on said ramp and abutted against said stop along a side thereof.

25. The combination as set forth in claim 24 wherein said ramp is of a height at an upper end to permit movement of said weighing scale thereover onto a bed for weighing of a patient in the bed.

26. The combination as set forth in claim 24 wherein said ramp has a plurality of slides for sliding of said scale thereon.

27. The combination as set forth in claim 24 wherein said frame is of skeletal structure and is recessed intermediately thereof along one side to permit access thereto for moving said scale from said ramp.

28. A method of weighing a bed-ridden patient comprising the steps of
placing a scale of low profile on top of a bed and beside a bed ridden patient;
placing the bed-ridden patient on the scale; and
obtaining a read-out of the weight of the patient.

29. A method of weighing a bed-ridden patient, comprising the steps of
bringing a scale of low profile next to a bed;
rolling a bed-ridden patient to one side;
sliding the scale onto the bed;
rolling the patient onto the scale; and
reading out the weight of the patient on the scale.

30. A portable scale for in bed weighing of a patient, said scale having a flat construction and contour with a height in the range of from about one inch to two inches and comprising
an elongated platform for receiving a load;
a support frame for mounting the scale on a surface;
a flexure means supporting said platform on said support frame for movement in a manner to maintain said platform parallel to said support frame;
second means secured to said flexure means for producing a read-out of the weight of a load placed on said platform; and
a display connected to said second means within said platform for displaying a value of the load on said platform.

31. A portable scale as set forth in claim 30 wherein said platform is contoured to receive a bed-ridden patient in a comfortable manner.

32. A portable scale as set forth in claim 30 wherein said platform has a raised longitudinal wall along one side to provide an abutment for a bed-ridden patient.

33. A portable scale as set forth in claim 30 wherein said second means includes a least one torsion bar secured to said flexure means at one end of the scale, a beam secured to one end of said torsion bar and extending along one side of the scale, a spring secured to and between said beam and said support frame for restraining motion of said beam and a read-out means for indicating the amount of movement of said beam as a measure of the load on said platform.

* * * * *

UNITED STATES PATENT AND TRADEMARK OFFICE
CERTIFICATE OF CORRECTION

PATENT NO. : 4,487,276

DATED : December 11, 1984

INVENTOR(S) : Burt L. Swersey et al.

It is certified that error appears in the above-identified patent and that said Letters Patent is hereby corrected as shown below:

Column 7, line 7, "74" should read -- 74' --.

Signed and Sealed this

Seventh Day of May 1985

[SEAL]

Attest:

DONALD J. QUIGG

Attesting Officer     Acting Commissioner of Patents and Trademarks